United States Patent [19]
Marko et al.

[11] Patent Number: 5,280,541
[45] Date of Patent: Jan. 18, 1994

[54] CORDLESS TELEPHONE COMMUNICATION SYSTEM LINK RE-ESTABLISHMENT PROTOCOL

[75] Inventors: Paul D. Marko, Ft. Lauderdale; Stelios J. Patsiokas, Plantation; Craig P. Wadin, Sunrise, all of Fla.

[73] Assignee: Motorola, Inc., Schaumburg, Ill.

[21] Appl. No.: 782,022

[22] Filed: Oct. 24, 1991

[51] Int. Cl.$^5$ .......................................... H04M 11/00
[52] U.S. Cl. .......................................... 379/61; 379/58; 455/51.1; 455/54.1
[58] Field of Search .......................... 379/58-61, 379/63; 455/33.1, 33.2, 34.1, 34.2, 51.1, 54.1, 62; 370/29, 100.1, 104.1, 105.1

[56] References Cited
U.S. PATENT DOCUMENTS
4,811,380 3/1989 Spear ........................................ 379/63
5,020,051 5/1991 Beesley ..................................... 370/29

OTHER PUBLICATIONS
ETSI discloses a CT2 Common Air Interface version 1.1, by European Telecommunications Standards Institute, France, Jun. 30, 1991, pp. 1-188.

DTI discloses a standarized CT2-Protocol, by the Department of Trade and Industry, London, May 1989.

*Primary Examiner*—Jin F. Ng
*Assistant Examiner*—Dwayne D. Bost
*Attorney, Agent, or Firm*—Pedro P. Hernandez

[57] ABSTRACT

A method for re-establishing a communication link that has been lost between a portable unit (406) and a fixed unit or base station (402) provides for a way of quickly re-establishing the lost communication link, on the previously used RF channel. The method is begun by transmitting a link re-establishment code word (900) using MUX 1 after determining that synchronization has been lost (502) for a predetermined period of time (504). This is followed by automatically switching the portable unit (406) from MUX 1 to MUX 3 communication protocol. Followed by re-establishing communication (re-establish synchronization) between the portable (406) and base station (402) in MUX 3 and switching the two communication devices (402 and 406) back to MUX 1 after the communication link has been re-established. The same steps can be followed by base site (402) if it had been the first to detect loss of the communication link.

10 Claims, 10 Drawing Sheets

MUX 3 - LINK INITIATION
(GENERATED BY THE PORTABLE ONLY)

MUX 2 - LINK ESTABLISHMENT
(ALSO USED FOR LINK INTITIATION FROM THE BASE)

MUX 1 - VOICE/DATA COMMUNICATIONS,
SIGNALLING INFORMATION, AND CONTROL
MESSAGES.

900   902

| LINK SETUP DIRECTION | MESSAGE DIRECTION | MUX MODE | LID CONTENT |
|---|---|---|---|
| CPP TO CFP | CPP -> CFP | MUX3 | END POINT ID |
|  | CFP -> CPP | MUX2 | LINK REFERENCE ID |
|  | BOTHWAY | MUX2 MUX1 | LINK REFERENCE ID |
| CFP TO CPP | CFP -> CPP | MUX2 | BASE ID (BID) |
|  | CPP -> CFP | MUX2 | BASE ID (BID) |
|  | BOTHWAY | MUX2 MUX1 | LINK REFERENCE ID |
| LINK RE-ESTABLISH | CPP -> CFP | MUX3 | LINK REFERENCE ID (LAST RECEIVED VALUE) |
|  | BOTHWAY | MUX2 MUX1 | LINK REFERENCE ID |

1000

CORDLESS TELEPHONE COMMUNICATION SYSTEM LINK RE-ESTABLISHMENT PROTOCOL

TECHNICAL FIELD

This invention relates generally to the field of portable or cordless telephone systems and more specifically to the communication link re-establishment protocol between a cordless telephone handset and a base station in a cordless telephone communication system.

BACKGROUND

A portable telephone system, such as the second-generation digital cordless telephone (CT2) system, has multiple transceivers (providing multiple RF channels) which are located at a call point station or public base station known as a telepoint. These transceivers allow persons using portable telephones or cordless telephone handsets to access the public telephone network when in range or within a service area after the cordless handset has established a synchronous link with the base system.

In the CT2 system, the cordless handset initiating a call, asynchronously transmits on one available channel of the handset's transceiver which corresponds to a transceiver radio frequency (RF) channel of the base. For a good understanding of the CT2 system communication protocol one is referred to a publication entitled, "Common air interface specification to be used for the interworking between cordless telephone apparatus in the frequency band 864.1 MHz to 868.1 MHz, including public access services", Version 1.1, dated Jun. 30, 1991, which is published by the European Telecommunications Standards Institute and is hereby incorporated by reference. The present standard for cordless telephones is publication entitled, "Common Air Interface Specification To Be Used For The Interworking Between Cordless Telephone Apparatus Including Public Access Services., MPT 1375: May 1989", Amendment No. 1, dated November 1989, published by the Department of Trade and Industry, London, England, and which is hereby incorporated by reference.

In the typical CT2 system three main communication protocols, called multiplex 3 (MUX 3), multiplex 2 (MUX 2) and multiplex 1.4 or 1.2 (MUX 1.4 or MUX 1.2) are utilized for communication between the cordless handset (or as referred to in the industry cordless portable part, "CPP") and the base station (or cordless fixed part, "CFP"). MUX 3 is utilized mainly for communication link initiation (link establishment and reestablishment) between the CPP and CFP. The MUX 2 protocol is used primarily for communication link establishment and for link initiation from the base (CFP). While the MUX 1 protocol is used primarily for voice-/data communications, signalling information, and control messages from the CPP (portable) and CFP (base).

In the CT2 system, the cordless handset initiating a call, asynchronously transmits on one available channel of the handset's transceiver which corresponds to a transceiver radio frequency (RF) channel of the base.

According to one protocol out of other applicable protocols, called multiplex 3 (MUX3) of the CT2 specification, the channel used by the cordless handset is first divided in the time domain into 7 frames, F1-F7, as illustrated in FIG. 1a. Accordingly, the cordless handset transmits continuously for five frames or transmission bursts of ten milliseconds and the receiver receives for four milliseconds in a receiving time-slot window, when the transmitter is turned off for two frames. Within the ten milliseconds of transmit time comprising 5 frames, the information is repeated four times (in each submux) within a two millisecond frame, as seen in FIG. 2.

A typical layout of the MUX3 format in a sequential order of the frames is shown in FIG. 2. The labels F1 through F7, respectively, indicate frame numbers. The period of a single frame is two milliseconds. Referring to both FIGS. 1b and 2, each frame, F1-F7, is divided into four smaller subframes s1-s4 containing differently sized data (D) or frame synchronization words (CHMP), each preceded by a different number of preamble bits (P). The entire synchronization and data information of the repeating data signal 16 is then repeated four times in each of the four subframes s1-s4.

All the subframes, where the complete information is periodically provided once, are grouped together to form a submultiplex or submux 40. Each frame thus consists of four submuxes 40, corresponding to the subframes s1-s4. Within each submux 40, a D channel synchronization character (SYNCD), 3 address code words (ACW), and a frame synchronization character of twenty-four bits (CHMP) exist. Each of these information words are preceded by some number of preamble bits. Each subframe or submux consists of thirty-six bits, in a row. Finally, the first two bits of the 8 bit preamble word of the next 10 bit SYNCD data word ends the first row of the first submux or subframe s1. The rest of the D channel data are arranged accordingly, as seen in FIG. 2.

On the other end as seen in FIG. 1b, the base station asynchronously receives (14) and transmits (12) alternately for one millisecond in a time domain duplex (TDD) burst mode, after a synchronous link has been established with another CT-2 protocol MUX1 or MUX2. While scanning through the different radio frequencies of its transceivers, the base station looks for the presence of a synchronization signal (i.e. the frame synchronization character CHMP) to determine if that channel or frequency is used by a handset in a call attempt.

Acknowledged and unacknowledged information transfer over the link occurs through codewords sent in the D channel at regular intervals. The general codeword structure, depicted in FIG. 11, contains 64 total data bits. Address codewords (ACW) are preceded with a 16 bit synchronization word (SYNCD) to enable the receiver to establish codeword framing.

In FIG. 3A, a simplified MUX 3 link initiation packet is shown. The two other important communication protocols utilized in a CT-2 communication system are MUX 2, shown in FIG. 3B, and MUX 1 (implemented either via MUX 1.2, 2 bit signalling, or MUX 1.4, 4 bit signalling), shown in FIG. 3C. MUX 2 is used after link initiation under MUX 3 has been achieved. MUX 2 is used to carry the D, or signalling channel information, and SYN, or synchronization channel information, for communication link establishment and re-establishment. B channel information which carries the 32 kbit/second speech or data is nonexistent in MUX2. MUX 2 carries the D channel at a data rate of 16 kbit/second and the SYN channel at an overall rate of 17 kbit/second. The SYN channel consists of ten bits of preamble (one-zero transitions) followed by a channel marker (CHMF) or synchronization marker (SYNC). Data bits in the D channel are aligned in MUX 2 so that the D channel synchronization word, SYNCD, occurs as the first 16 bits in the D channel after the SYN channel.

In FIG. 3C, the MUX 1 signalling packet is shown. MUX 1 is envoked from MUX 2 by a control message. MUX 1 is used bi-directionally over an established link to carry D channel (Data) and B channel (speech/data). The SYN (synchronization) channel is nonexistent in this multiplex and therefore should burst synchronization be lost, it cannot be recovered without reinitializing the communication link. MUX 1 supports both 68 bit (referred to as MUX 1.4) or 66 bit (referred to as MUX 1.2) burst structures. It is up to each system manufacturer to decide which of the two to utilize for MUX 1 signalling. MUX 1 data rates are 2.0 kbit/second for MUX 1.4 and 1.0 kbit/second for MUX 1.2. Data bytes in the D (data) channel are aligned in this multiplex so that bytes always start on a frame boundary.

As can be seen from the above discussion, if after a communication link between a cordless telephone and a CT-2 base station is lost after the link is in MUX 1 (voice communication has begun) or in MUX 2, the units must both return to MUX 3 to resynchronize with each other. The present link re-establishment protocol in CT-2 systems has been found not to provide the level of performance that is required for such systems. Typical problems experienced with present CT-2 systems include "selective multipath" which causes loss of link synchronization in MUX 1 and thereby requires link re-establishment in order to continue voice communications. Another major problem is caused by another communication unit operating in an asynchronous mode occupying an RF channel closely spaced to the RF channel being utilized by the cordless telephone. Finally, given the low power (10 milliwatt) maximum power output of the CT-2 portable unit, communication links can be lost by a portable user moving out of range of the base station. All of the above mentioned problems cause the communication link to fail by causing loss of synchronization in MUX 1 between the base station and portable, thereby requiring link re-establishment.

A need exists in CT-2 systems for a communication link re-establishment protocol which can provide more reliable and efficient link re-establishment after loss of a communication link between a CT-2 portable unit and a CT-2 base station.

SUMMARY OF THE INVENTION

The present invention provides for an improved link re-establishment protocol between first and second communication devices (e.g., a portable unit and base station), after the communication link has been interrupted. The first and second communication devices communicate with each other utilizing a first communication protocol and a second linking communication protocol. The re-establishment sequence begins by first determining at the first communication device that communication has been interrupted from the second communication device while the two communication devices have been communicating using the first communication protocol. This is followed by waiting a first predetermined period of time after determining that communication has been interrupted at the first communication device in order to determine if communication with the second communication device has been re-established.

The first communication device transmits a link re-establishment code word to the second communication device after the first predetermined period of time has elapsed without communication having been re-established with the second communication device and prior to a second predetermined period of time elapsing which is measured from the first period of time elapsing. The re-establishment code word is transmitted using the first communication protocol. This is followed by switching the first communication device from the first communication protocol, to the second communication protocol. The final step in re-establishing the communication link comprises re-establishing communication between the first and second communication devices in the second communication protocol and switching the two communication devices back to the first communication protocol.

DETAILED DESCRIPTION OF THE PREFERRED EMBODIMENT

Figure 1A:
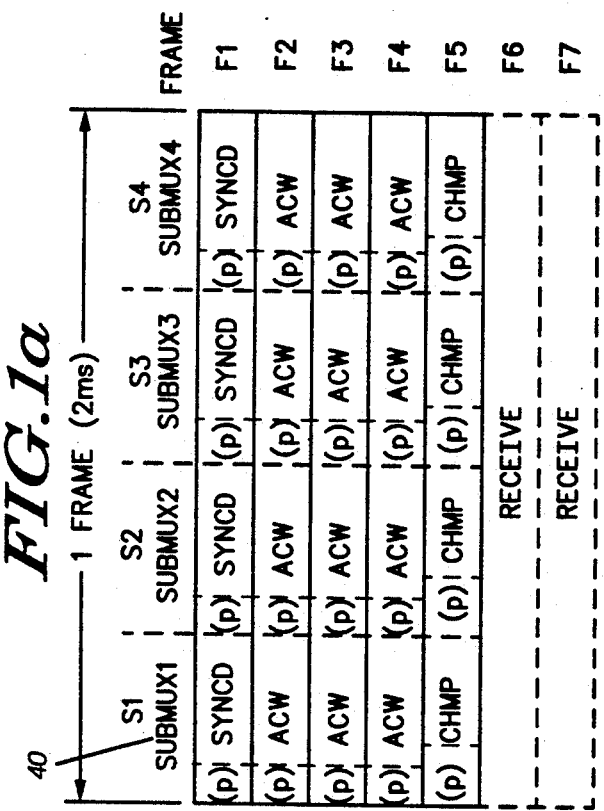
FIGS. 1A-B is a protocol of a CT2 MUX 3 system.
Figure 1B:
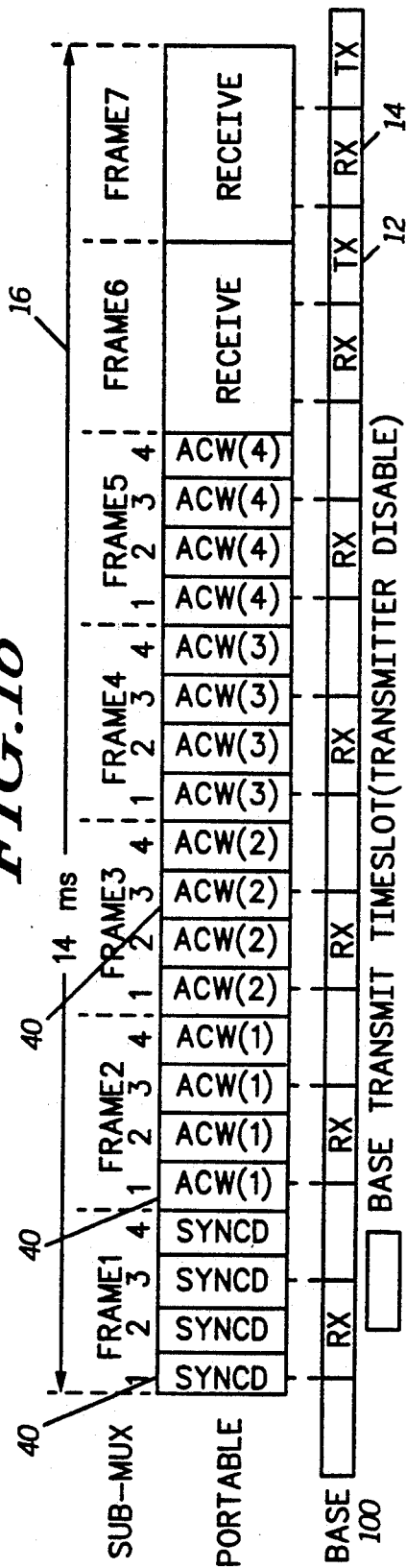
Figure 2:
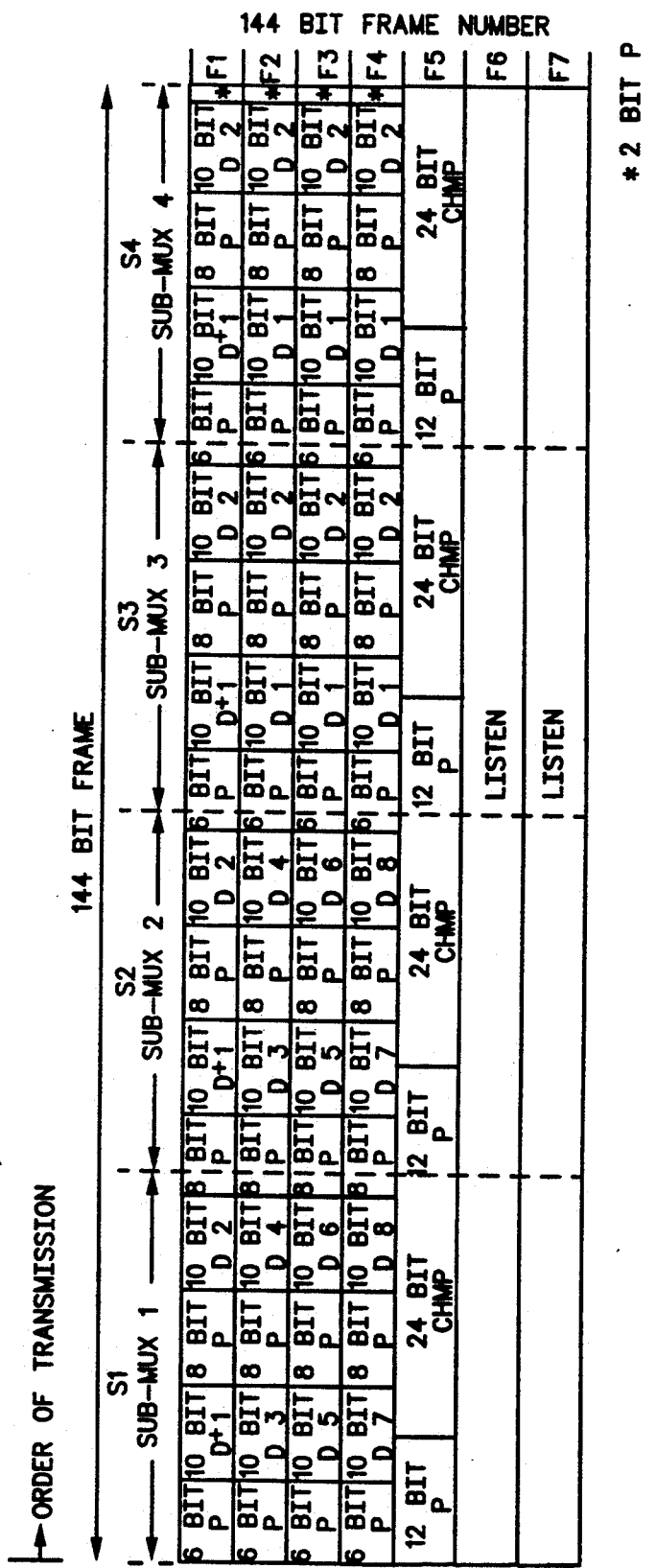
FIG. 2 is a typical layout of a MUX 3 format of FIG. 1.
Figure 3A:
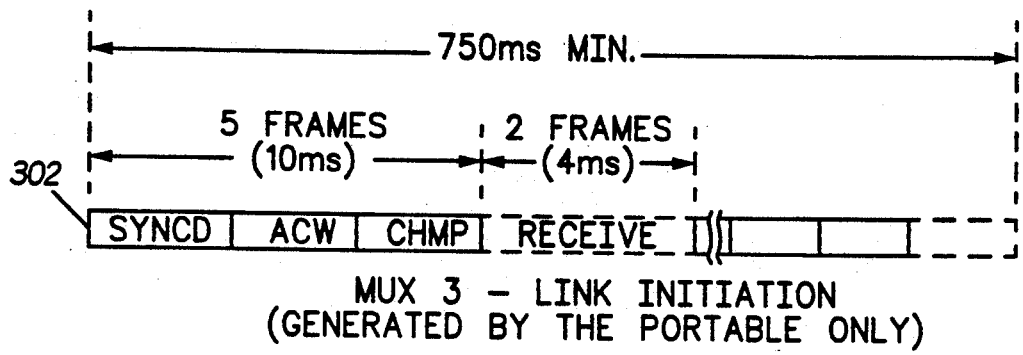
FIG. 3A shows a typical link initiation protocol (or MUX 3) in accordance with the present invention.
Figure 3B:
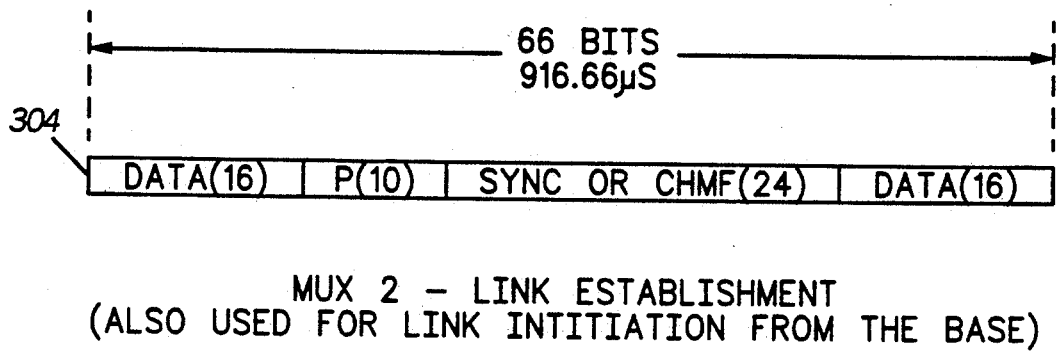
FIG. 3B shows a typical link establishment protocol (or MUX 2) in accordance with the present invention.
Figure 3C:
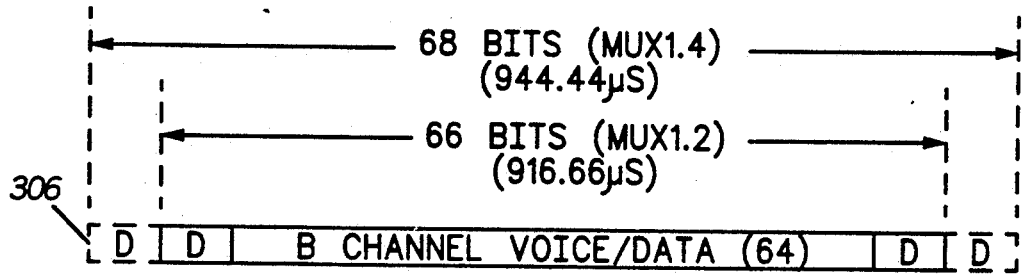
FIG. 3C shows a typical voice/data protocol (or MUX 1) in accordance with the present invention.
Figure 4:
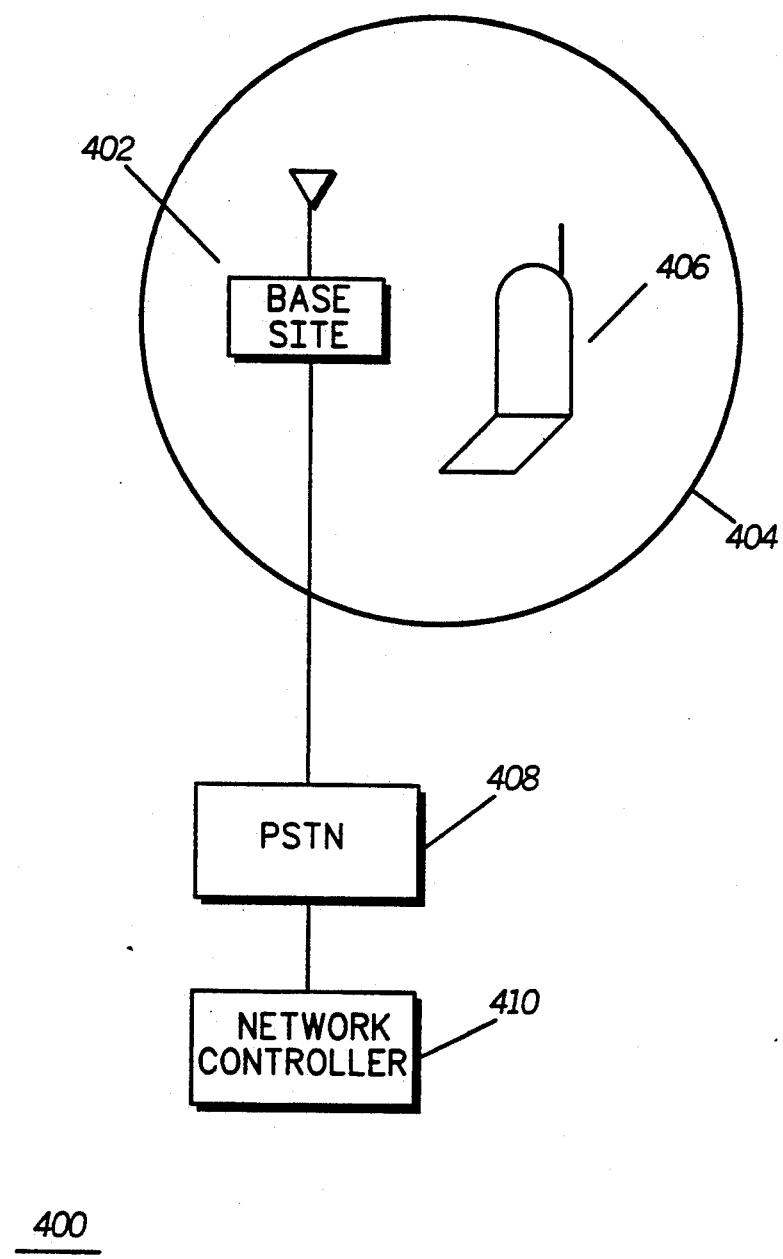
FIG. 4 shows a diagram of a communication system in accordance with the invention.

In FIG. 4, a typical CT-2 communication system 400 is shown. The communication system (preferably a second generation cordless telephone, or CT2, system) comprises at least one base site (represented by base site 402), and at least one portable communication unit 406 (which is preferably, a cordless telephone handset). Base site 402 has a typical operating range represented by area 404. Base site 402 is coupled to the Public Switched Telephone Network (PSTN, public telephone system) 408 via telephone lines or via any suitable wireless or wireline communication channel (e.g., microwave links, etc.). Connected to the PSTN 408 is network control station 410, which is capable of communicating with base site 402 (normally each system 400 will include a number of base sites 402). Communications between network controller 410 and the individual base station 402 can be accomplished such as by direct dialing over the PSTN 408.

Each base site 402 can have a plurality of RF channels (typically, 1-40 for use by a portable unit 406). Upon requesting access to a base site 402, the portable unit will scan the RF channels in order to get an available channel. At which point the handset 406 transmits a link request in MUX 3 which base 402 can grant in MUX 2. This is followed by a MUX 2 handshake between the two units and a portable ID check in order to establish the identification of the portable unit 406 (used in billing user).

Figures 9, 10:
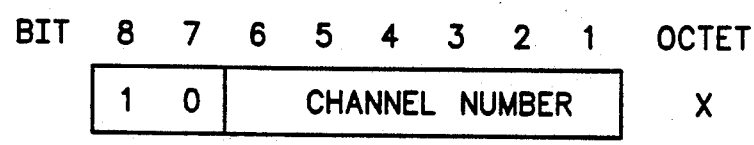
FIG. 9 shows a packet diagram for a CT-2 link re-establishment codeword.
FIG. 10 shows a matrix of the typical handshake sequence between the cordless telephone device (CPP) and the telepoint base station (CFP).
Figure 11:
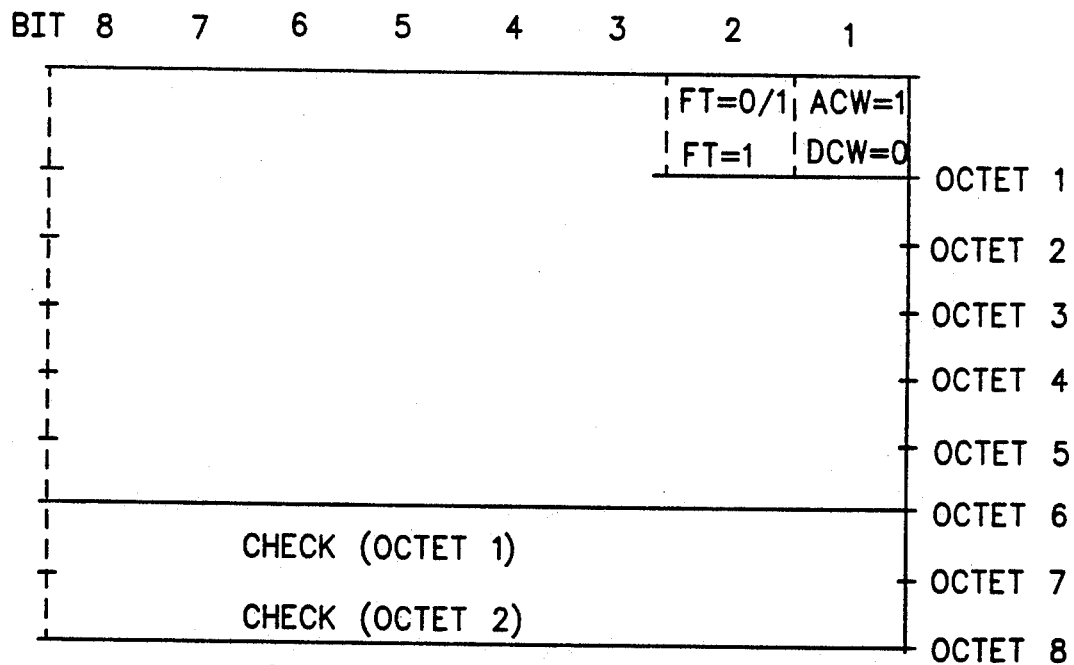
FIG. 11 shows a diagram for a general CT-2 codeword format.

In FIG. 10, a matrix showing the typical handshake sequences between the cordless telephone device (CPP) and the telepoint base station (CFP) are shown. The matrix 1000 shows the link setup direction, the message direction, MUX mode, and the content of the Link Identification Code (LID) for each handshake. The LID is used for the following purposes:

i) End point identification for CPP (handset) call setup.

ii) Link reference for associating CPP (handset) and CFP (base) call during handshake exchanges and link re-establishments.

iii) Base identifier (BID). This is a ringing address to which one or more CPP's will respond to.

These steps are followed by the units going to MUX 2 protocol where the base 402 sends a supervisory message and acknowledgement. The capabilities of both the portable 406 and base 402 are determined, and authorization to use the system 400 is determined by base 402. The two units move on to the MUX 1 protocol by an acknowledgment by the portable 406. Once in MUX 1, dial tone is sent out by base 406, the portable unit 406 then dials the telephone number he wishes to access. This is finally followed by a voice communication link being established between portable 406 and then dialed number telephone number. The voice messages are either transmitted using the MUX 1.2 or MUX 1.4 format depending on the system 400 being utilized.

Figure 5:
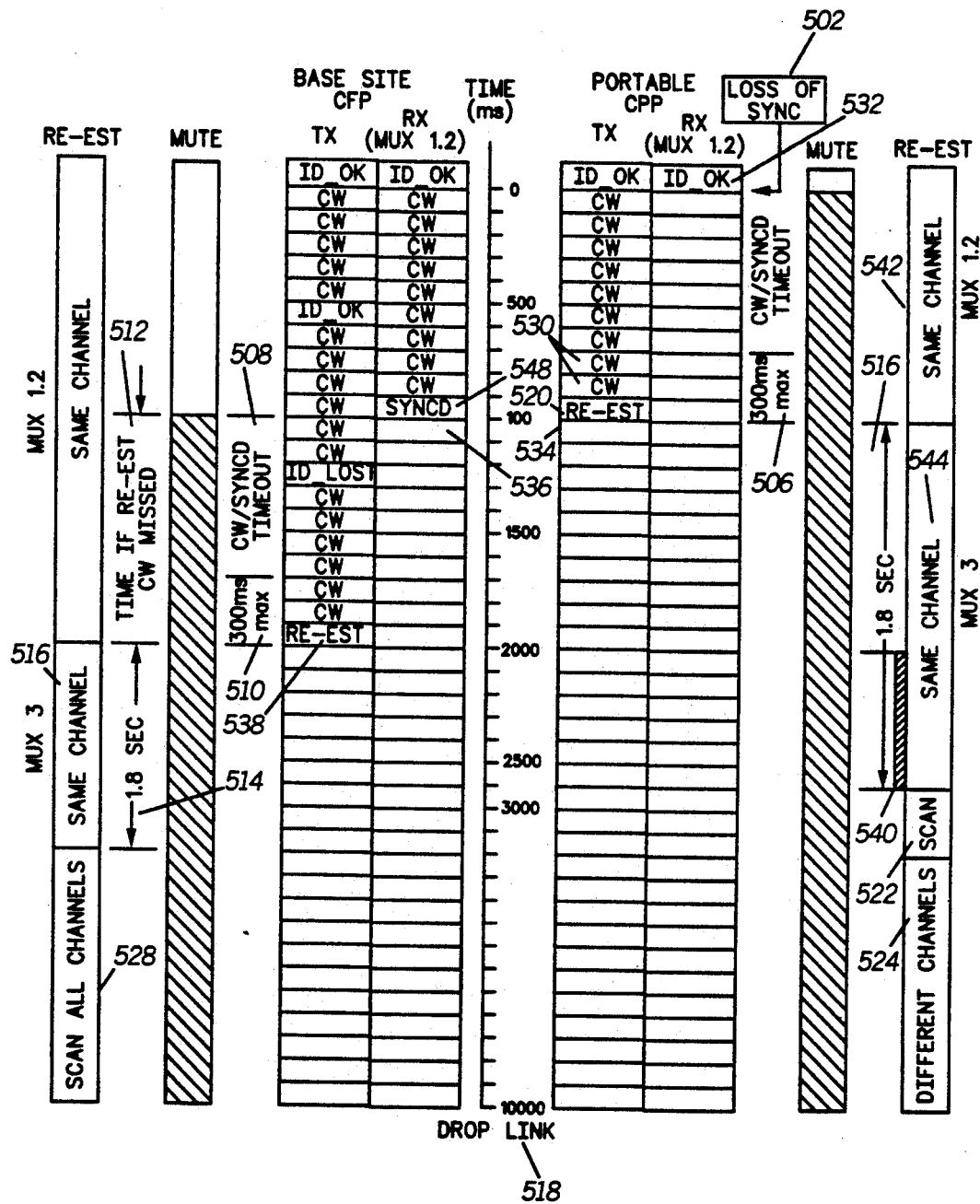
FIG. 5 shows a timing diagram for a communication link re-establishment sequence when the portable communication device (CPP) is the first to detect loss of synchronization in accordance with the present invention.

In FIG. 5, a timing diagram for a communication link re-establishment sequence when the portable communication device (CPP) 406 is the first to detect loss of synchronization in accordance with the present invention is shown. Communication link re-establishment on the same RF channel may occur upon request from either the cordless telephone 406 or the base station 402 in an established link. The method utilized by the present invention, is to cause the cordless telephone 406 to transmit in MUX 3 with CHMP in the SYN channel in a similar fashion to normal call set up from the cordless telephone 406.

In the preferred embodiment, the cordless telephone 406 will maintain a 700+/−200 millisecond timer 504 (Trcw) that is restarted on each reception of a good code word (CW) or SYNCD in MUX 2, MUX 1.2 or MUX 1.4.

If the receive codeword timing interval 504 (Trcw) (see FIG. 5) expires without the portable unit 406 receiving a code word (CW) or SYNCD, the cordless telephone 406 or base station 402 (depending on which one lost synchronization first, in FIG. 5 it is the portable 406) must cease MUX 1 or MUX 2 transmissions in less than 300 milliseconds 506 (Tremax, second portable timer). During this period, the communication device (either 402 or 406) will transmit a complete channel number zero (same channel) link re-establishment message (discussed later and shown in FIG. 9). This can be seen in that in both the MUX 1.2 and MUX 3 timelines 542 and 544 the same RF channel is used. In FIG. 5, a worst case scenario of the portable 406 continuing to transmit CW's 530 until the last moment prior to transmitting the re-establishment code word (RE-EST) 520, is shown. The transmission of the re-establishment code-word 520 could have occurred right after the Trcw timer 504 had expired if no data was available to be buffered at portable 406 (no CW's 530). Typically, code words (CW) 530 will continue to be sent due to the fact that the handset user is not aware of the fact that the link has been interrupted and the user is still talking via the handset.

In the preferred embodiment, the portable communication device 406 can also attempt link re-establishment after three seconds loss of communication handshake. This is determined by starting a timer after each reception of an ID_OK (or SYNCD) 532 and upon not receiving another one within a three second window (a handshake timer interval), transmitting a link re-establishment code word 520. To initiate a link re-establishment based on loss of handshake, the communication device 406 must transmit a complete channel number zero (same RF channel) link re-establishment message 520 immediately prior to ceasing MUX1 or MUX2 transmissions.

Action at the cordless telephone device 406 after transmission or reception of a channel number zero link re-establishment message 520 (in the case of FIG. 5, the portable is the one that transmitted the RE-EST code word 520), the cordless telephone 406 immediately switches to MUX3 in 534. Then using the last received link reference in the LID field, continues to transmit fixed format link request code words in MUX3. This is done for a period between 1.6 seconds and 2.0 seconds (Tech, timing interval) 516 on the existing (same channel that portable was on prior to losing link) RF channel. If the existing channel timer (Tech, timing interval) 516 times out without a successful link re-establishment, the cordless telephone 406 must acquire a free channel and transmit in MUX3 with CHMP in the SYN channel, using the last received link reference in the LID field. Link re-establishment attempts shall cease when the 10 second ID_OK handshake time-out timing interval 518 (Tholst) expires. The Tholst timing interval 518 provides the communication device a guarantee of leaving the re-establishment protocol if no linkage has occurred.

The CT-2 base station 402, after transmission or reception of a channel number 0 link re-establishment message, the base station 402 immediately ceases transmission and switches to MUX 3 (546) in the receive mode. In FIG. 5, base site 402 is shown in the worst case scenario where it also has lost synchronization and does not receive the RE-EST code word from portable 406. In a typical situation where base 402 has not lost synchronization, it will receive the RE-EST code word at slot 536 and immediately go to MUX 3 to re-establish communications with portable 406.

The base station side of FIG. 5 also includes comparable timing intervals which are executed by the base station 402. These include a base Trcw timing interval 508 also set at 700 ms +/−200 ms, a second timing interval of 300 millisecond maximum (Tremax) 510, a 3 second handshake timer which resets after each ID_OK or SYNCD being received, but expires if neither is received within this time frame, forcing a RE-EST code word being transmitted. Also, the base includes the 1.8 second existing (same) channel timing interval 514.

Once in MUX 3, base 402 then awaits reception of a link request code word, containing the link reference in the LID field (link identification code), for a period of time between 1.6 and 2.0 seconds (base site Tech, timing interval) 514 on the existing channel. The LID is used for for portable call set up. In this case the LID identifies a specific base site 402 or a requested service. Also, the LID is utilized for link reference for associating the portable 406 to base site 402 call during handshake exchanges and link re-establishment so that communication is maintained with the initial end point only. The LID is a 16 bit field in the the handshaking packet sent between the base 402 and portable 406.

In the scenario presented in FIG. 5, base site 402 after transmitting it's own RE-EST code word 538 base site 402 goes to MUX 3 (546) in order to re-establish the communication link. If no interference is present once both devices are in MUX 3, link re-establishment will occur in approximately the 2 second time line marker (in this specific scenario where the base site also losses synchronization).

In a best case scenario, after portable 406 transmits the RE-EST code word 520, which could occur right after the 700 ms timer 504 expires, the base site 402 can immediately detect the code word if it has not lost synchronization. At which point the base 402 would go immediately to MUX 3 and re-establish the link with portable 406. Overall, the present invention in this best case scenario could re-establish the link within 1 second and on the same RF channel.

If no re-establishment is achieved, base station 402 must begin channel scan of other channels 528 as required by the conventional CT-2 default specification when the existing channel timer (Tech) 514 expires, without a successful link re-establishment. Link re-establishment attempts by the base site 402 will also cease when the 10 second handshake time-out (Thlost) 518 expires.

The same channel MUX 3 protocol overlap occurs in time period 540 where both the base unit 402 and portable 406 are in the same RF channel and in MUX 3. It is in this overlap 540 where link re-establishment will typically occur, barring any interferences from other sources (other communication devices, environmental noise, etc.).

As been shown by the worst-case scenario presented in FIG. 5, the present invention under normal conditions will typically re-establish a communication link within a window of 1-2 seconds as compared to typically much longer times in prior re-establishment implementations. Under the old link re-establishment method, a land-line telephone side user would typically hang-up after not hearing any information from a CT-2 portable 406 user, which would require the CT-2 user to re-dial the telephone number. This would require re-establishing a CT-2 communication link from scratch, causing both loss of time and money for the CT-2 user and loss of CT-2 system efficiency. Under the present invention, given the fact that not only link re-establishment can occur typically within a 1-2 second window, the CT-2 handset 406 will typically re-establish communication on the same RF channel that he had been on prior to the loss of the link. This shorter time period for re-establishment of the link will increase the chances that the land line telephone user will not hang-up the communication link with the CT-2 handset 406.

By maintaining the unit for the 1.8 second (Tech) timer 516 on the same channel, provides for an overlap window 540 to be available where both the base unit 402 and portable 406 will be in MUX 3 and on the same channel. Overlap window 540 will give under most conditions a good opportunity for the conventional link re-establishment sequence to allow both units to re-establish the communication link and go back to MUX 1 in order to allow the portable 406 to continue its voice communications.

Although specific time intervals have been specified for the preferred embodiment, those skilled in the art will realize that the maximum amount of time for each timer to expire can be determined by each individual system's individual requirements.

Figure 6:
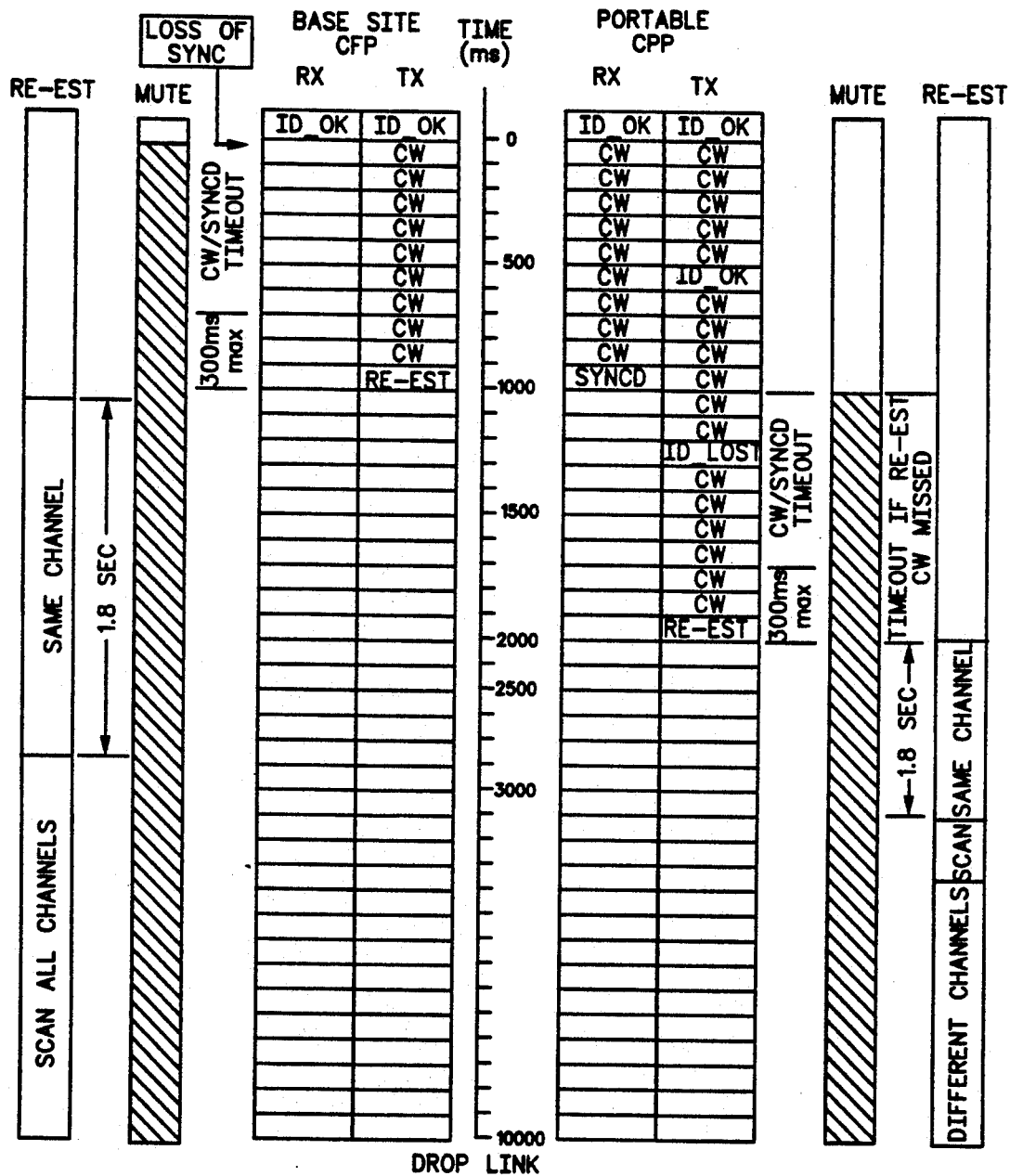
FIG. 6 shows a timing diagram for a communication link re-establishment sequence when the fixed communication equipment (CFP) is the first to detect loss of synchronization in accordance with the present invention.

In FIG. 6, a timing diagram for a communication link re-establishment sequence when the fixed communication equipment (CFP) is the first to detect loss of synchronization in accordance with the present invention is shown. The sequence for the base (CFP) site 402 is similar to the sequence discussed previously in FIG. 5.

Figure 7:
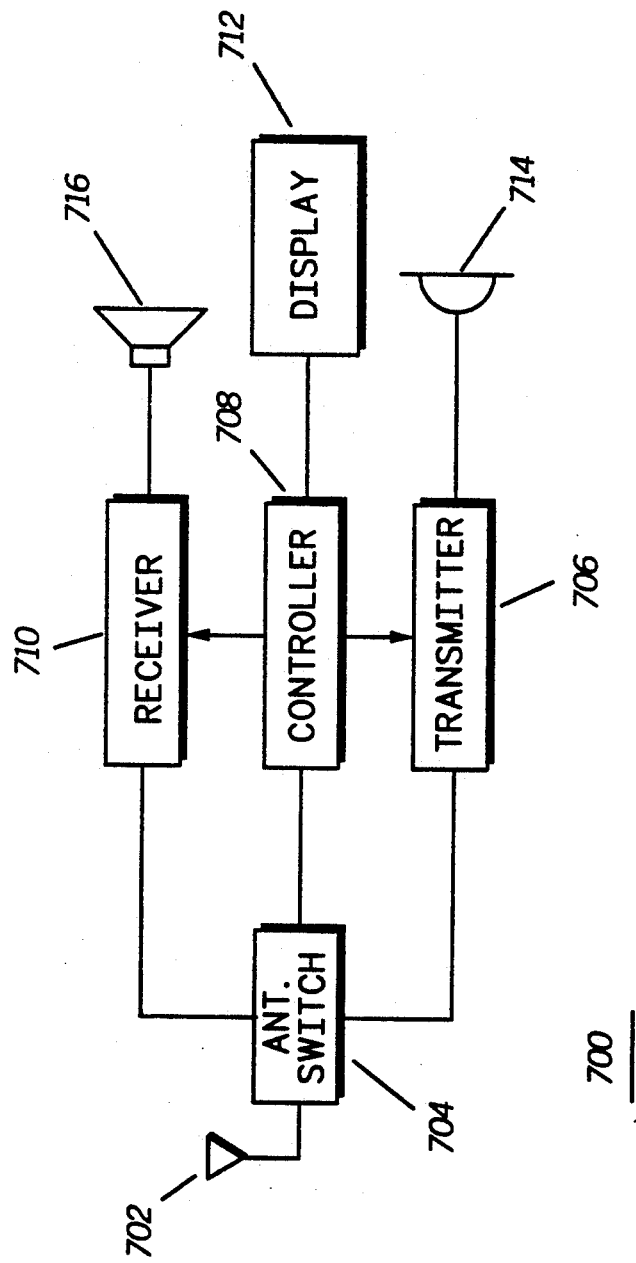
FIG. 7 shows a block diagram of a cordless telephone device in accordance with the present invention.

In FIG. 7, a block diagram of a cordless telephone device 700 (similar to portable 406 in FIG. 4) in accordance with the present invention is shown. The handset 700 includes, a controller unit 708 such as a microprocessor which controls a conventional time domain duplex receiver 710 and transmitter 706. An antenna switch or circulator 704 selectively couples the transmitter 706 and receiver 710 to antenna 702. A display 712 is also included for displaying information such as telephone number dialed, etc. A speaker 716 is coupled to receiver 710 for the presentation of voice messages. A microphone 714 is coupled to transmitter 706 for inputting voice messages to be transmitted by handset 700. Controller 708 provides for all of the timing requirements required to implement the present invention. Controller 708 keeps track of the Trcw 700 millisecond receive code word timer, the Tremax maximum re-establishment timer, the 3 second handshake loss timer, the 1.8 second Tech timer, and the overall 10 second Thlost handshake lost timer of the present invention. Some of the timers will be running concurrently and some will be updated upon the reception of data by radio 700. All the timers (execution of timing intervals) are preferably performed using conventional timing algorithms which are executed by controller 708. Controller also acts as a switching means directing the base 402 to switch communication protocols (MUX's) at the given times. Controller 708 also directs the transmission of the data used in re-establishing the communication link with the base site 402, and automatically switches communication protocol upon link re-establishment.

Figure 8:
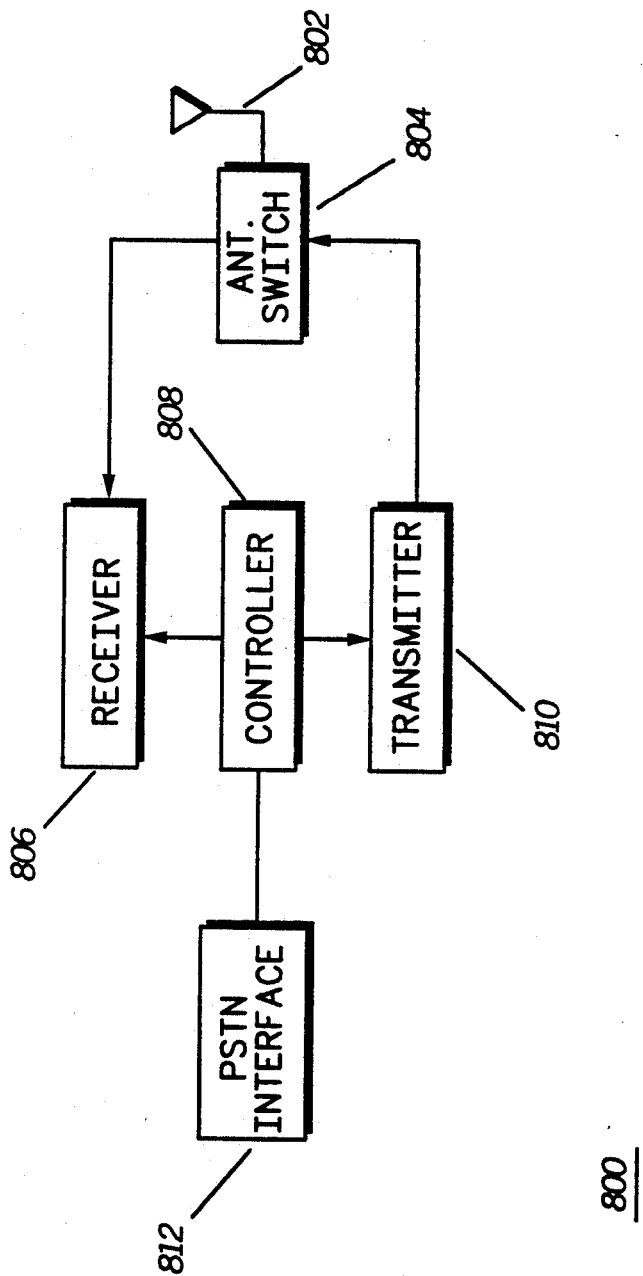
FIG. 8 shows a block diagram of a telepoint base station in accordance with the present invention.

Referring to FIG. 8, a public base site (or wireless phone booth, similar to base sites 402 shown in FIG. 4) 800, in accordance with the invention, is shown in block diagram form. The base site 800 comprises a receiver means such as a conventional receiver 806 and a transmitter means such as conventional transmitter 810. Both the transmitter 810 and receiver 806 are selectively coupled to antenna 802 via circulator or antenna switch (transmit/receive switch) 804 to allow for time-division multiplexing (TDM) to occur. TDM is the preferred method of transmission used in the CT2 system 400. Also included in base site 800 is a controller means, such as controller 808 that is a conventional microcontroller or microprocessor with associated memory, I/O lines, etc. as known in the art. The controller means 808 controls the overall operations of base site 800, including the operation of receiver 806 and transmitter 810. Coupled to controller 808 is PSTN interface circuit 812, which allows base site 800 to communicate over the PSTN 408 to the central network controller 410 or to private telephone numbers (e.g., households). The receiver 806 in combination with the controller 808 act as a measurement means for measuring the received signal strength of the received messages originating at the handset 120. The receiver 806 will measure the signal strength of the incoming message and relay it to controller 808 where the data is processed using software algorithms stored in controller 808. The controller 808, depending on the request type, will transmit a return message back to handset 406 via transmitter 810. All of the timing (all timing intervals) required to implement the present invention as previously discussed will be implemented using controller 808. Controller 808 also preforms switching of communication protocols (e.g., MUX 1 to 3 etc.), re-establishment of the communication link by controlling transmitter 810, and switching the communication protocol upon re-establishment.

In FIG. 9, a link re-establishment code word or message 900 is shown in accordance with the invention. Code word 900 which is shown as RE-EST in both FIGS. 5 and 6 can be sent by either the CPP or CFP (portable 406 or base site 402). It shall cause an immediate attempt at link re-establishment on a given channel number. In the preferred embodiment, the channel number section 902 will be set at zero indicating re-establishment on the same (current channel). The re-establishment code word 900 is sent unacknowledged for either base 402 or portable 406. In a typical CT-2 system 400 there are typically as many as forty RF channels so that channel section 902 can theoretically be from 1-40. As previously stated, in the preferred embodiment, section 902 is set at zero in order to provide for a more effective re-establishment sequence in the same (current) channel that the base 402 and the particular portable unit 406 had previously established.

In summary, the present invention provides for a more efficient method of re-establishing a communication link between a base station 402 and a cordless telephone 406 upon interruption of communications (loss of synchronization). The present invention, allows for a faster re-establishment sequence than the present CT-2 re-establishment sequence and at the same time provides for a greater chance of re-establishing the linkage in the same RF channel that both devices had previously captured. By re-establishing the communication link quickly in the previously established RF channel, all problems associated with the dynamic channel allocation sequence and system capacity of a typical CT-2 system are avoided.

What is claimed is:

1. A method for re-establishing a communication link on a previously established RF communication channel between first and second communication devices after the communications between the first and second communication devices has been interrupted in a cordless telephone communication system which allocates one RF communication channel from among a plurality of RF communication channels, the first and second communication devices communicating with each other utilizing a first communication protocol and a second linking communication protocol, comprising the steps of:

(a) determining at the first communication device that communication with the second communication device has been interrupted by failing to receive select information during a first predetermined period of time established by a first timer;

(b) transmitting a link re-establishment code word from the first communication device to the second communication device after the first predetermined period of time has elapsed, and prior to a second timer elapsing, the second timer commencing upon the first timer elapsing;

(c) switching the first communication device from the first communication protocol to the second linking communication protocol before the expiration of the second timer;

(d) commencing a third timer after the second timer has elapsed, the third timer being long enough to provide that the second communication device has also switched to the second linking communication protocol before the third timer elapses;

(e) re-establishing communications between the first and second communication devices using the second linking communication protocol before the third timer elapses; and (f) switching the two communication devices back to the first communication protocol once the communication link has been re-established.

2. The method for re-establishing a communication link of claim 1, wherein the first communication device is a base station and the second communication device is a portable telephone device.

3. The method for re-establishing a communication link of claim 1, wherein the first communication device is a portable telephone device and the second communication device is a base station.

4. A method for re-establishing a communication link as defined in claim 1, wherein step (a) comprises the steps of:

(a1) commencing the first timer after the reception of a code word or synchronization word;

(a2) determining if another code word or synchronization word has been received before the expiration of the first timer; and (a3) resetting the first timer if another code word or synchronization word is received before the expiration of the first timer.

5. A method for re-establishing a communication link as defined in claim 4, comprising the further steps of:

(g) determining at the second communication device that communication with the first communication device has been interrupted by failing to receive predetermined information at the second communication device during a first period of time established by a first timer located in the second communication device;

(h) transmitting a link re-establishment code word from the second communication device to the first communication device after the first timer located on the second communication device has elapsed and prior to a second timer located on the second communication device elapsing, the second timer located on the second communication device commencing its timer sequence upon the first timer located on the second communication device elapsing; and (i) switching the second communication device from the first communication protocol to the second linking communication protocol before the expiration of the second timer sequence.

6. A method for coordinating the re-establishment of a communication link on a previously established RF communication channel between first and second communication devices operating in a cordless telephone system having a plurality of RF communication channels, and the first and second communication devices communicating with each other utilizing a first communication protocol and a second linking communication protocol, comprising the steps of:

(a) transmitting a link re-establishment code word from both the first and second communication devices to the other of the first and second communication devices before a predetermined period of time has elapsed at each of the first and second communication devices since each of the first and second communication devices have received select information;

(b) switching the first and second communication devices from the first communication protocol to the second linking communication protocol before the expiration of the predetermined period of time at each of the first and second communication devices;

(c) commencing an existing channel timer at each of the first and second communication devices after the predetermined period of time has elapsed at each of the first and second communication devices, the existing channel timer providing a timing sequence which is long enough to provide that both the first and second communication devices have both switched to the second linking communication protocol before the existing channel timer elapses at either of the first and second communication devices;

(d) re-establishing communications between the first and second communication devices in the second linking communication protocol before the third timer elapses at either of the first and second communication devices; and (e) switching the first and second communication devices back to the first communication protocol once the communication link has been re-established on the second communication protocol.

7. A method for coordinating the re-establishment of a communication link on a previously established RF communication channel as defined in claim 6, wherein the first communication device is a base station and the second communication device is a portable telephone device.

8. A method for coordinating the re-establishment of a communication link on a previously established RF communication channel as defined in claim 6, wherein the first communication device is a portable telephone device and the second communication device is a base station.

9. A portable telephone device for operation in a cordless telephone system which has a base station which allocates one RF communication channel from among a plurality of RF communication channels, the portable telephone device and base station communicate with each other utilizing a first communication protocol and a second linking communication protocol on an established RF communication channel, the portable telephone device comprising:

a receiver means for receiving selected information from the base station;

first timer means responsive to the receiver means for providing a first time-out signal if the if the receiver does not receive the selected information from the base station within a first predetermined period of time;

second timer means for initiating a second timer sequence in response to the first time-out signal;

transmitter means for transmitting a link re-establishment code word to the base station using the first communication protocol prior to the second timer sequence elapsing;

switching means for switching the portable telephone device from the first communication protocol to the second linking communication protocol after the re-establishment code word has been transmitted and prior to the second timer sequence elapsing;

third timer for initiating a third timer sequence upon the second timer sequence elapsing, the third timer sequence being long enough to provide that the base site has switched to the second linking communication protocol before the third timer sequence has elapsed;

re-establishment means for re-establishing communications between the portable telephone device and the base station using the second linking communication protocol before the third timer sequence elapses; and means for automatically switching the portable telephone device back to the first communication protocol once the communications between the portable telephone and the base station have been re-established.

10. A base station for operation in a cordless telephone system, the base station allocates one RF communication channel from among a plurality of RF communication channels to a portable telephone, the portable telephone and base station communicate with each other utilizing a first communication protocol and a second linking communication protocol on the allocated RF communication channel, the base station comprising:

a receiver means for receiving selected information from the portable telephone;

first timer means responsive to the receiver means for providing a first time-out signal if the if the receiver does not receive the selected information from the portable telephone within a first predetermined period of time;

second timer means for initiating a second timer sequence in response to the first time-out signal;

transmitter means for transmitting a link re-establishment code word to the portable telephone using the first communication protocol prior to the second timer sequence elapsing;

switching means for switching the base station from the first communication protocol to the second communication protocol after the re-establishment code word has been transmitted and prior to the second timer sequence elapsing;

third timer for initiating a third timer sequence upon the second timer sequence elapsing, the third timer sequence being long enough to provide that the base site has switched to the second linking communication protocol before the third timer sequence has elapsed;

re-establishment means for re-establishing communications between the base station and the portable telephone using the second linking communication protocol before the third timer sequence elapses; and means for automatically switching the base station back to the first communication protocol once communications between the base station and the portable telephone have been re-established.

* * * * *